3,170,669
ECCENTRIC PLUG VALVE HAVING ANTI-SLAMMING MEANS
William N. Roos, St. Cloud, Minn., assignor to Dezurik Corporation, Sartell, Minn., a corporation of Minnesota
Filed Oct. 13, 1960, Ser. No. 62,474
8 Claims. (Cl. 251—160)

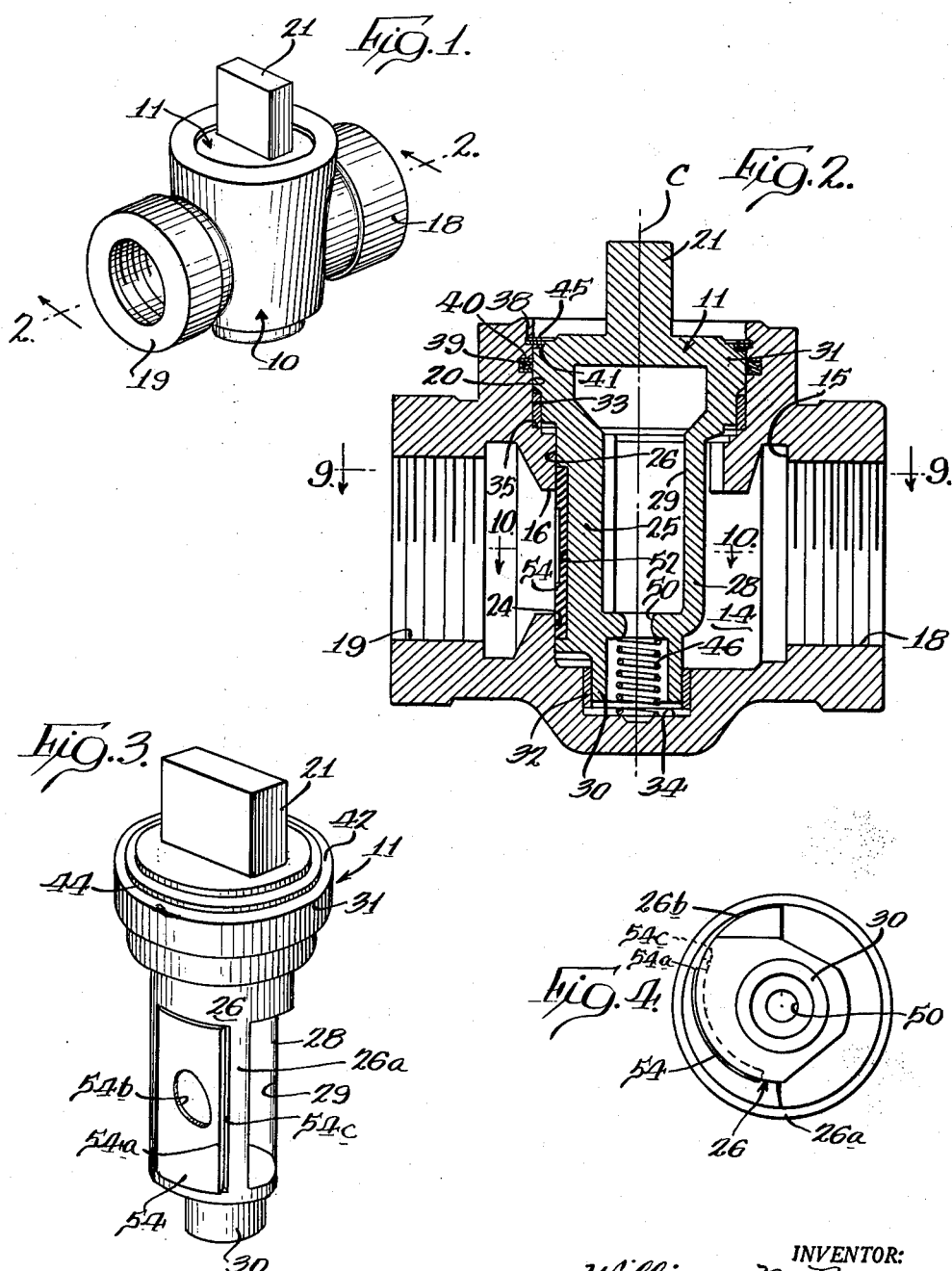

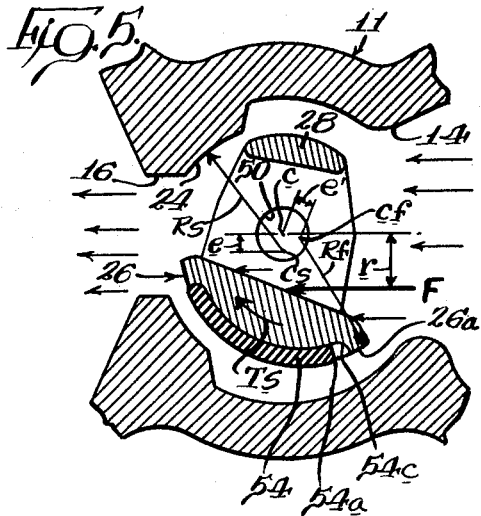
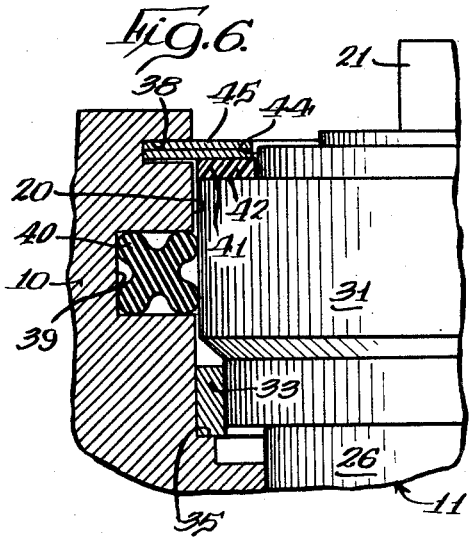
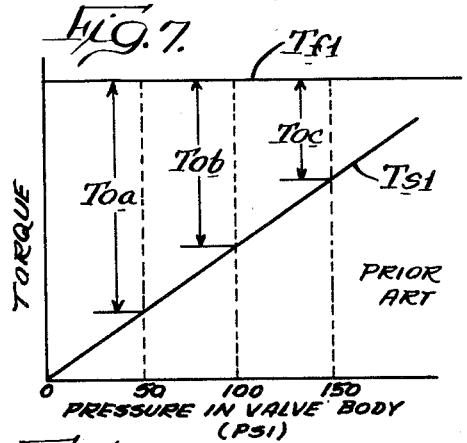
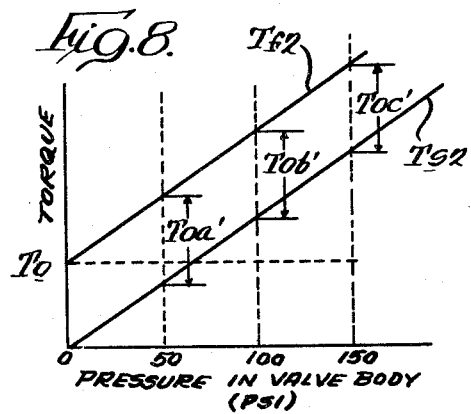
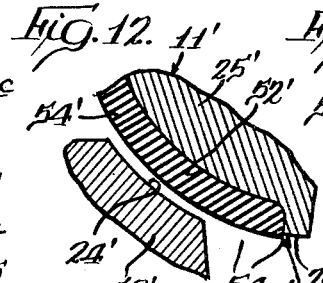
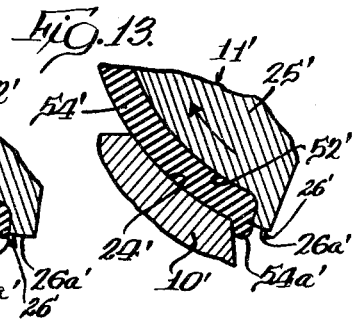
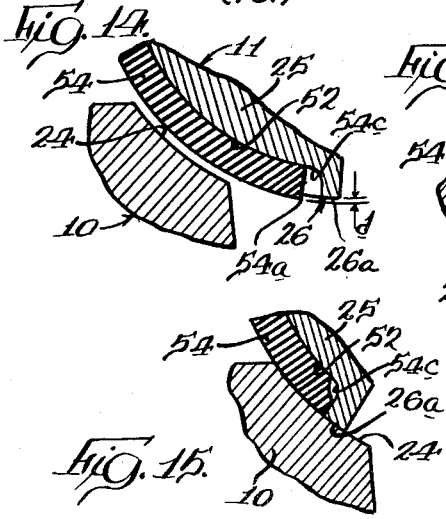
INVENTOR:
William N. Roos
BY
Wolfe, Hubbard, Voit & Osann
Att'ys Feb. 23, 1965 W. N. ROOS 3,170,669
ECCENTRIC PLUG VALVE HAVING ANTI-SLAMMING MEANS
Filed Oct. 13, 1960 3 Sheets-Sheet 3
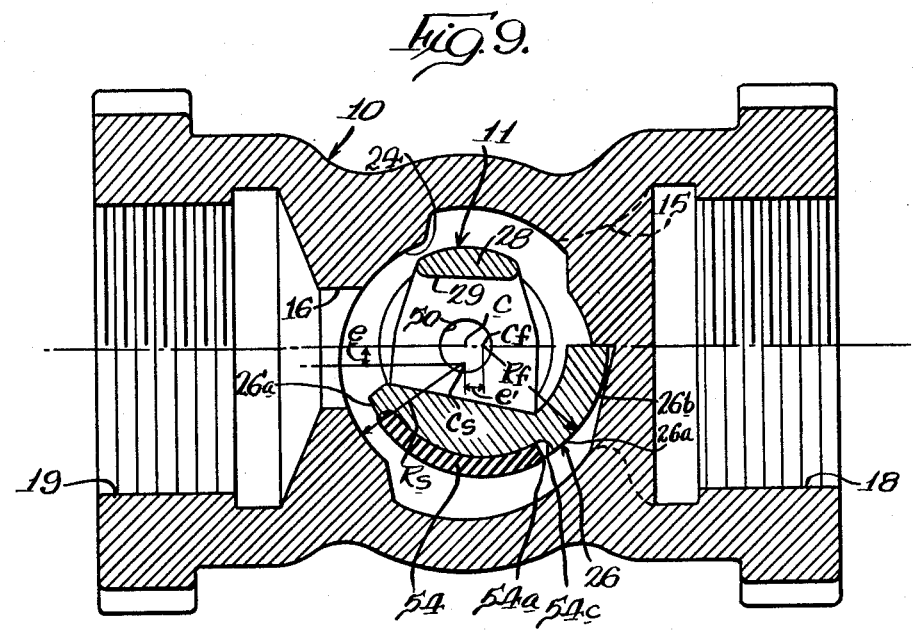
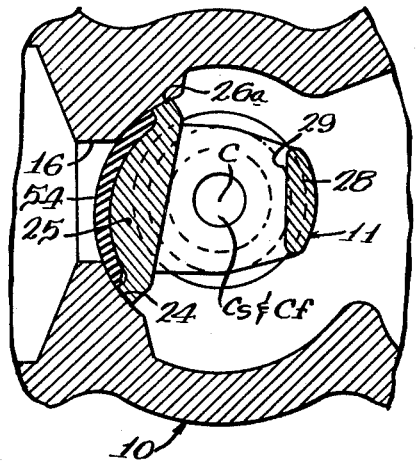
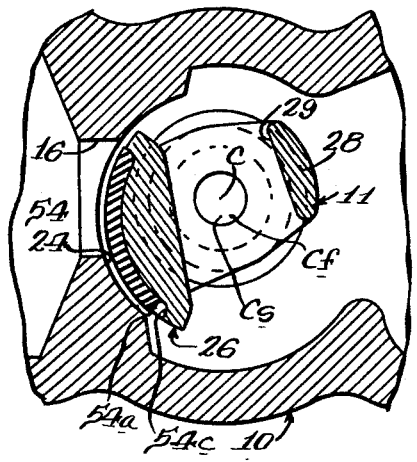
INVENTOR:
William N. Roos
BY
Wolfe, Hubbard, Voit, Osann
Att'ys

United States Patent Office 3,170,669
Patented Feb. 23, 1965

This invention relates in general to valves for controlling the flow of fluids, both liquids and gases, in pipes or conduits. More particularly, the invention has to do with eccentric type plug valves in which an eccentric plug is rotatable between two angular positions in a valve body to open or close a flow passage therethrough.

It is the general aim of the invention to achieve an improved eccentric plug valve which is rugged, compact, and economical in construction, and yet which will remain reliable and easy to operate over many years in service and many open-close cycles of operation.

It is a related object to provide an eccentric plug valve which is immune to the tendency to "slam" closed or open as a result of fluid flowing therethrough, yet in which the plug may be rotated by a much smaller applied torque than has heretofore been possible.

Another object of the invention is to provide an eccentric plug valve in which frictional resistance against "slamming" of the plug is automatically increased or decreased as the pressure in the valve body increases or decreases. Since in many applications, the rate of flow through the valve and the resulting slamming tendency vary as the pressure in the valve body, the resistance against slamming is automatically increased or decreased as it needs to be.

It is a further object of the invention to eliminate the need for a bulky, external mechanism for creating frictional resistance against slamming in an eccentric plug valve, and indeed to provide an extremely compact and inexpensive arrangement for accomplishing this purpose which at the same time serves the additional functions of (1) retaining the plug in the valve body and (2) excluding dirt and foreign matter from the interior of the valve body.

Still another object of the invention is to provide such an arrangement for creating frictional resistance against "slamming" in an eccentric plug valve, characterized by resilient means which create a constant "bias" resistance independent of fluid pressure, and which prevent the removal of a retainer which locks the plug in the body until the plug is axially shifted against the force exerted by the resilient means.

Still another object of the invention is to provide an eccentric plug valve which remains free and easy to operate over a period of years without the addition of lubricant.

Other objects and advantages will become apparent as the following description proceeds, taken in conjunction with the accompanying drawings, in which:

FIGURE 1 is a perspective view of an eccentric plug valve embodying the features of the invention;

FIG. 2 is a vertical cross-section of the valve showing the plug in its closed position;

FIGS. 3 and 4 are perspective and bottom views, respectively, of the eccentric plug;

FIG. 5 is a fragmentary horizontal section of the valve illustrating how "slamming" torque on the plug is produced by fluid flow;

FIG. 6 is an enlarged, fragmentary view corresponding to a part of FIG. 2 and illustrating details of friction, sealing and retaining means;

FIGS. 7 and 8 are graphs depicting variations in slamming torque, frictional resistance torque, and operating torque versus internal pressure for a typical prior art valve and for the present valve, respectively;

FIG. 9 is a horizontal section taken substantially along the lines 9—9 in FIG. 2, but showing the plug in its fully opened position;

FIGS. 10 and 11 are fragmentary views corresponding to a portion of FIG. 9, but respectively illustrating the plug in fully closed and partially opened positions;

FIGS. 12 and 13 are enlarged fragmentary sections of a plug having a resilient insert, and illustrating a problem of cutting or chewing encountered when these parts are not constructed according to the present invention; and FIGS. 14 and 15 are similar to FIGS. 12 and 13, but illustrate how the problem is overcome by parts constructed as herein described.

While the invention has been shown and will be described in some detail with reference to a particular embodiment thereof, there is no intention that it thus be limited to such detail. On the contrary, it is intended here to cover all modifications, alternatives, and equivalents falling within the spirit and scope of the invention as defined by the appended claims.

Referring now to FIGS. 1 and 2, the eccentric plug valve there shown has as its major parts a body 10 and a plug 11 disposed therein. The body is hollow and its interior walls define a flow passage 14 between inlet and outlet openings 15, 16 which are adapted for connection to pipes or conduits by suitable means such as threaded collars 18, 19. Opening substantially normal or at right angles to the flow passage 14 is an entrance into the body which is defined by a circular wall 20, and into which the plug 11 is inserted.

In general, the plug 11 extends across the flow passage 14, and is journaled for rotation through approximately ninety degrees between two angular positions, i.e., opened and closed positions (compare FIGS. 9 and 10). A flat-surfaced lug 21 extends upwardly from the top of the plug 11 to receive a wrench or the like by which an operator may rotate the plug between its two limit positions.

Referring for the moment to FIGS. 5 and 9, the center or axis of the circular entrance 20 is located at C, and the plug 11 is journaled for rotation about this axis. The body 10 is, however, cast and machined with an interior, arcuate seat surface 24 which has a radius of curvature $R_s$ and a center or axis of curvature $C_s$, the latter being parallel to but eccentrically displaced by a distance $e$ from the axis of rotation C. The seat surface 24 borders and surrounds the outlet opening 16, and sealing contact with this surface will, therefore, close the flow passage 14 through the valve body.

Closing or opening of the valve is effected by an eccentric portion 25 of the plug 11, this portion having a thickness considerably less than the width of the flow passage 14. As best shown in FIG. 9, the eccentric portion 25 is machined to have an arcuate surface or face 26 which has a radius of curvature $Rf$ and a center or axis of curvature $Cf$. The center or axis of curvature $Cf$ is parallel to but displaced eccentrically by a distance $e'$ from the axis of rotation $C$. In the preferred construction here shown, the two radii of curvature $Rs$ and $Rf$ for the arcuate seat 24 and the arcuate face 26 are substantially equal. Moreover, the displacement or eccentricity $e$ of the center $Cs$ from the axis of rotation $C$ is substantially equal to the eccentricity $e'$ of the center $Cf$, so that the two centers $Cs$, $Cf$ become superimposed when the plug 11 is in the fully closed position illustrated by FIG. 10.

The eccentric portion 25 of the plug 11 is strengthened by a spaced, parallel brace 28 which extends from the top to the bottom portions of the plug and leaves a large central opening 29 which becomes aligned with the flow passage 14 when the plug is in its opened position (FIG. 9).

On the other hand, as the plug is rotated clockwise from the position shown in FIG. 9 to that illustrated in FIG. 10, the face 26 is moved progressively into firm, sealing contact with the seat 24, so that eccentric portion 25 completely closes off the opening 16 and prevents the flow of fluid through the valve body. The eccentricity of the arcuate seat 24 and the plug face 26 relative to the axis of rotation $C$ results in gradual mating of these surfaces and progressive closure of the valve.

It will be observed from FIGS. 2 and 3 that the plug 11 is machined to have a hollow, cylindrical tail portion 30 at its lower end and a cylindrical head portion 31 of considerably larger diameter at its upper end that is, the head portion 31 is dimensioned to be snugly but rotatably positioned within the large diameter circular entrance 20. The outer cylindrical surfaces of the head and tail portions are disposed concentrically about the axis of rotation $C$, and they are journaled in bushings or bearings 32 and 33 when the plug is inserted into the body 10, as shown. These bearings are preferably of the porous type, for example sintered bronze, impregnated with a lubricant so as to be self-lubricating over their entire life. The lower bearing 32 is press-fitted into a cylindrical pocket or recess 34 formed in the body, while the upper bearing 33 is press-fitted into the circular entrance 20 against a radial shoulder 35 formed at the bottom of that entrance.

Before proceeding to discuss the novel features of the present valve, it will be helpful to review the troublesome tendency of "slamming" which is present in eccentric plug valves. Whenever the plug 11 is at a partially opened position, fluid flow (represented by small arrows in FIG. 5) creates forces on the inner surface of the eccentric portion 25. These forces may be considered as creating a single force vector F which acts at a radius $r$ from the center $C$ about which the plug is rotatable, thereby creating torque $Ts$ which tends to "slam" the plug to the closed position illustrated in FIG. 10. The magnitude of the slamming torque $Ts$ depends upon the pressure drop and the rate of flow through the valve, and to some extent upon the particular angular position at which the plug is disposed. It will also be apparent that the slamming tendency is present when fluid flows in the opposite direction through the valve body except that the plug then tends to be "slammed" to its opened position.

In some prior eccentric valves, this slamming problem has been met by adding an external, adjustable friction device or "brake" which creates a drag opposing rotation of the plug. Such arrangements have considerably increased external dimensions of the valve, and added to the expense of manufacturing. Moreover, the external friction devices when once adjusted produced a constant braking torque, and were necessarily adjusted to produce a restraining torque sufficient to prevent slamming movement of the plug at the highest pressures and flows which the valve was expected to accommodate. If the valve were subsequently subjected to only very low pressures and flows, the operator nevertheless had to exert a very high operating force on the plug to move it between opened and closed positions. In other words, in low flow or pressure installations, an excessive restraining torque was present and required unnecessary strength and exertion on the part of the operator to move the plug.

These drawbacks have been eliminated in the valve here disclosed. In accordance with the present invention, a very simple and compact structural arrangement is provided to apply a restraining torque on the plug 11 which increases or decreases with increasing and decreasing pressures in the valve body. In most instances, as the flow or pressure drop changes to increase or decrease the slamming torque, the pressure within the valve body changes to increase or decrease the frictional resistance opposing slamming. The plug is always prevented from slamming, yet the frictional resistance to rotation of the plug is never so great as to add excessively to the torque required to turn the plug. In addition, the structure which produces this variable resistance against slamming also serves to keep the plug in the valve body, and to exclude dirt and other foreign or abrasive material from the seal and bearing surfaces.

As here shown particularly in FIGS. 2 and 6, the valve body 11 is formed with first and second annular grooves 38 and 39 cut into the wall 20 which defines the circular entrance. Disposed in the groove 39, which is immediately above the bearing ring 33, is a sealing ring 40 made of a resilient, deformable material such as synthetic rubber or the like. The sealing ring 40 is somewhat larger in cross-section than the groove 39, so that it is not only held captive but is also deformed into fluid tight sealing contact with the adjacent cylindrical surface of the head portion 31. Preferably the sealing ring is of the configuration familiarly known as a "quad-ring." It bears with good sealing contact both against the surface of the head portion 41 and the sides of the groove 39.

As thus far described, the plug 11 is journaled for rotation in the valve body 10, and fluid is sealed against escape through the entrance 20. In order both to retain the plug in the valve body and to create the automatically variable frictional resistance against slamming, as noted above, a braking ring 41 of friction material is disposed to overlie and engage a portion of the end surface of the plug. As here shown, the head portion 31 of the plug 11 is stepped to define a peripheral radial end surface 42 (substantially greater in radius than the radius $Rs$ of the seat 24 as observed by reference to FIGS. 2 and 6 conjointly) and an axial shoulder 44, the braking ring 41 resting upon the radial surface and being prevented from shifting by the shoulder 44. To bear against the upper surface of the braking ring 41, an annular retainer ring 45 is held captive in the groove 38 and with its inner portion overlying the ring 41.

Preferably, the braking ring is made of a wear-resistant material such as nylon or the like and which possesses an appreciable coefficient of friction. Moreover, since the braking ring 41 has an external diameter substantially equal to the external diameter of the head portion 31 of the plug (as shown in FIGS. 2 and 6), the retarding torque developed thereby is maximized. Also, the braking ring desirably is made of a material which is pressure sensitive in its frictional characteristics, i.e., in which the drag or retarding torque exerted on the plug increases markedly as the axial compression of the ring is increased. The retaining ring 45 is preferably constructed as a radially compressible steel snap ring. Its inside diameter is only slightly greater than the diameter of the shoulder 44, so that the retaining ring, having once been snapped into the groove 38, cannot be compressed radially and removed, unless the plug 11 is first axially depressed, as hereinafter described.

The plug 11 is so formed as to have means which urge it axially outward of the entrance 20, i.e., against the retaining ring 45, with a force which depends upon the pressure of fluid within the valve body. With reference to FIG. 2, it will be seen that fluid pressure existing in the flow passage 14 acts upwardly upon the plug 11, the latter thus being similar in this respect to a piston having an effective diameter equal to that of the head portion 31. While in a strict sense the tendency of the plug to slam varies with the rate of flow through, and thus with the pressure drop across, the valve passage, it is usually the case that when the valve plug is in an intermediate position, i.e., neither opened nor closed, the flow through the valve body is roughly related to the pressure therein. Thus, in a general sense when the flow through the valve and the slamming force on the plug 11 increase or decrease, the fluid pressure within the flow passage 14 will be higher or lower, and the axial force urging the plug upwardly will correspondingly increase or decrease. Thus, the friction or braking ring 41 will be compressed between the radial surface 42 and the retaining ring 45 with a force which depends upon the pressure in the valve body, and the frictional resistance against rotation of the plug will therefore increase or decrease as the tendency of the plug to slam increases or decreases.

It will also be noted in addition to providing variable frictional resistance to rotation of the plug 11, the braking ring 44 and the retainer 45 prevent the plug from moving out of the valve body, and that they also form a seal which prevents the entry of foreign, abrasive particles through the entrance 20 and into the region of the sealing ring 40 or bearing 33.

In the absence of appreciable fluid pressure in the valve body 10, the plug 11 would have very little frictional resistance against rotation thereof. In order to assure that some frictional resistance is always present, and that the weight of the plug itself does not tend to leave the frictional ring 44 totally uncompressed, resilient means here shown as a compression spring 46 are provided to urge the plug 11 upwardly, i.e., toward the retainer 45. As here illustrated in FIG. 2, the spring 46 is disposed within the hollow tail portion 30, its opposite ends bearing against the floor of the pocket 34 and the upper, inner surface of the tail portion 30. Since the spring 46 is under compression when the parts are assembled as shown in FIG. 2, it will always cause the friction ring 41 to be compressed to some degree, such compression being increased further in proportion to the fluid pressure in the valve body.

The spring 46 performs an additional, important function. When the valve is initially assembled, the plug is inserted through the entrance 20, the friction ring 41 laid on the surface 42, and the radially compressible snap ring 45 snapped into the groove 38. To make the ring 45 enter the groove, the plug 11 must be depressed inwardly against the bias of the spring 46. And once the snap ring 45 has been inserted into the groove 38, its inner edge is closely adjacent the axial shoulder 44. Therefore, the snap ring 45 cannot be compressed and removed from the groove 38, due to its inner abutment with the shoulder 44, until the plug 11 is positively pushed downwardly against the bias of the spring 46 to a point where the shoulder is clear of the inner edge of the snap ring. Thus, the spring 46 and the shoulder 44 cooperate to make certain that the retaining ring 45 is not accidentally dislodged from the groove 38.

Referring now to FIG. 7 the graph $Ts1$ illustrates the variation in slamming torque exerted on an eccentric plug as the flow or pressure drop through a valve body increases. It is assumed that the flow through the valve discharges into atmospheric pressure, so that the actual pressure in the flow passage 14 is the same as the pressure drop thereacross. It will be seen that the slamming torque varies approximately linearly with fluid pressure. In prior art valves of the type noted above employing external friction devices, the friction torque remained constant despite changes of pressure within the valve body and such constant friction torque is represented in FIG. 7 by the line $Tf1$. It will be apparent from FIG. 7, therefore, that with such prior art valves, the operator had to exert a turn-ing force or torque on the plug which depended upon the difference between the slamming torque and the friction torque in order to rotate the plug in the same direction as the slamming torque. Thus, if the pressure in such a prior art valve were 150 p.s.i., the slamming torque would be relatively great and the operator would have to exert an operating torque $Toc$ of relatively small magnitude in order to move the plug in the same direction as the slamming torque. If the pressure in the valve were low, i.e., 100 p.s.i., then the operator would have to exert a correspondingly greater operating torque $Tob$. Finally, if the valve were operating at a relatively low pressure of 50 p.s.i. the operator would be required to exert a very large force or operating torque 59A in order to move the plug in the same direction as the slamming torque.

The difficulty with the prior art arrangements depicted by FIG. 7 was that the frictional resistance $Tf1$ against slamming remained constant with changes in pressure, pressure drop, fluid flow and slamming torque, so that if the frictional resistance were made great enough to prevent slamming under the highest rates of flow, then a very high operating force would be required to shift the plug when the valve was operating with a low rate of flow therethrough. Moreover, when the plug was to be rotated in a direction opposite to the direction of the slamming torque, the operator had to exert a torque which was the sum of the slamming torque $Ts1$ and the friction torque $Tf1$. With the friction torque always relatively great, and extremely high operating torque often had to be applied to the plug to rotate the latter.

The improved operating characteristics of the valve described above with reference to FIGS. 2 and 6 are illustrated graphically in FIG. 8. The straight line $Ts2$ illustrates the variation in slamming torque with increasing internal pressure and rates of flow, it being assumed that the pressure drop is the same as the internal pressure in the valve body. This variation is substantially the same as that shown at $Ts1$ in FIG. 7. However, in FIG. 8 the magnitude of frictional torque opposing slamming of the plug is represented by the line $Tf2$, the latter indicating that frictional torque increases substantially linearly from an initial or bias value $To$ as the pressure within the valve body increases. When there is zero pressure within the flow passage 14 (FIG. 2), the spring 46 causes the friction ring 41 to be compressed so that it exerts a retarding torque $To$ which opposes rotation of the plug 11. Then, as the pressure within the valve body increases and exerts an increasing upward force on the plug to further compress the friction ring 41, the friction torque increases linearly as indicated by the line $Tf2$ in FIG. 8.

It will be seen that with the valve being operated at various rates of fluid flow and fluid pressure, the difference between the slamming torque $Ts2$ and the friction torque $Tf2$ remains substantially constant. Thus, at fluid pressure of 50, 100 and 150 p.s.i., the operator need only exert torques $Toa'$, $Tob'$ and $Toc'$, respectively to rotate the plug 11 in the same direction as the slamming torque. As a result of the very simple friction arrangement here disclosed, therefore, "slamming" of the plug is eliminated, yet in a manner such that the necessary operating torque to move the plug in the same direction as the slamming torque is not made appreciably greater than it needs to be under various conditions of flow and pressure. Of course, when the plug is to be rotated in a direction opposite to that of the slamming torque, the operating torque must overcome the sum of the slamming torque and the friction torque. This operating torque is, nevertheless, held within reasonable bounds by the present invention which keeps the friction torque small, but changes the value of the friction torque so that it always slightly exceeds the slamming torque.

In the exemplary valve construction, provision is also made for preventing washing or working of lubricant out of the porous, impregnated bearings described above. It will be seen from FIG. 2 that the spring 46 necessarily keeps the lower end of the tail portion 30 slightly elevated above the floor of the pocket 34. There is thus some space between the bottom of the pocket and the tail portion of the plug. As the valve is opened and closed and the pressure within the flow passage abruptly increased or decreased, the pressure in the lower portion of the pocket 34 would undergo the same changes by flow of fluid into and out of the pocket 14 through the pores or interstices of the bearing 32. Over a period of time, therefore, and especially with repeated abrupt pressure changes in the flow passage 14, the lubricant held in the porous bearing 32 would wash or work out of the latter and be lost in the fluid stream. Thus, it would be conceivable that after a period of several months or years the bearing 32 would be substantially depleted of lubricant. This could possibly result in seizure which would prevent rotation of the plug, or at least an undesired increase in resistance to rotation of the plug.

It is a feature of the present valve that this difficulty is substantially eliminated by the provision of a conduit or passage which establishes free communication between the bottom of the bearing pocket 34 and the flow passage 14, so that pressure in the pocket may change by a flow of fluid which does not pass through the bearing 32. In the present instance, this is accomplished by providing a vent or hole 50 in the lower portion of the plug 11, such hole establishing free communication between the passage 29 in the plug and the interior of the tail portion 30. Thus, as the fluid pressure within the interior of the body 10 abruptly increases or decreases, the pressure in the pocket 34 correspondingly and immediately increases and decreases by fluid flow through the vent 50. Because this fluid flow can occur quickly and with little resistance, it does not pass through the pores or interstices of the bearing 32, and the tendency of lubricant to be washed or worked out of that bearing is avoided. The bearing will freely journal the plug 11 for rotation over a period of years without the addition of lubricant.

A second advantage accrues from this venting action of the hole 50. If it were not there, sudden pressure surges, i.e., increases or decreases, would not be reflected immediately at the lower end of the plug 11 and the upward force thereon would not immediately increase or decrease in proportion to pressure changes in the flow passage 14. Thus, the compression of, and the frictional retardation produced by, the ring 41 would not quickly follow pressure changes and flow changes. The presence of the vent 50 avoids this difficulty and provides immediate raising or lowering of resistance to slamming as the pressure in the valve body abruptly increases or decreases.

The present eccentric plug valve is one which is intended to be "bubble tight," that is, to exhibit no leakage of bubbles when tested under water with relatively high gas pressure therein. In order to provide a gas-tight closure, when the face 26 is engaged with the seat 24, a resilient, deformable insert is employed on one of these surfaces so that it will be deformed into absolute sealing contact with the other surface. As here shown, the eccentric portion 25 is formed with a depression or recess 52 in the arcuate face 26. Disposed and bonded in this recess is an insert 54 made of a resilient, deformable material such as rubber or one of the synthetic resins. The material which is preferred for the sealing insert 54 is sold under the trade name "Viton A" by E. I. du Pont de Nemours and Company.

In the exemplary construction, the opening 16 in the valve body 10 is closed by two types of sealing contacts. As here shown, the resilient insert 54 is sized so that its periphery is somewhat larger than the opening 16, and so that it will engage the seat 24 with an area of contact which totally surrounds the opening 16. However, the resilient insert 54 is made somewhat smaller in its peripheral dimensions than the seat 24 which surrounds the opening 16, and the insert is also sized to leave border portions 26a of metal on the arcuate face 26 (FIG. 9). Thus, as the eccentric portion 25 of the plug 11 is rotated to the closed position illustrated in FIG. 10, the resilient insert 54 forms a first sealing contact against a portion of the seat surface 24; and the border portions 26a of the face 26 come into firm metal-to-metal sealing contact with the remaining area of the seat 24.

This construction and sealing engagement has important advantages. First, the metal-to-metal contact between the border portions 26a of the arcuate face 26 and the seat 24 forms a closed-position stop which limits rotation of the plug 11 in clockwise direction. This means that when the valve is fully closed, resistance to turning abruptly increases and the operator is immediately apprised of this. He will not and cannot continue to rotate the plug to such an extent that the resilient insert 54 would be unduly deformed and perhaps seriously damaged. Secondly, two independent sealing engagements are created, the first being the yieldable contact between the insert 54 and a portion of the seat 24, and the second being the firm contact of the mating arcuate metal surfaces 26 and 24. This means that if the resilient insert 54 should deteriorate with extreme aging, or as a result of the valve being subjected to extremely high temperatures in a fire, the valve will not totally fail. On the contrary, even though the resilient insert 54 is completely destroyed, an almost gastight seal will still be presented by the metal-to-metal engagement.

In providing a sealing face on the eccentric portion 25 of the plug which is only partially covered by the resilient insert 54, and which thus has a metal border surface 26a, the insert 54 must wholly or at least partially project beyond the metal surface 26 so that it will to some degree be deformed against the seat 24 when in the fully closed position. As shown best in FIG. 14, the rubber-like insert 54 has a thickness which is slightly greater than the depth of the recess 52, so that it normally extends beyond the plug face 26 by a distance $d$, which may for example be about 0.015 inch. This means that those portions of the insert which engage the seat 24 will be deformed into sealing contact therewith and into a shape flush with the face 26 when the latter is brought into mating engagement with the seat 24 as the plug reaches its closed position. To save on the quantity of material required for the insert 54, it may if desired be made simply ring-like in configuration, since the central portion which registers with the outlet opening 16 is not essential. A molding void 54b in the central portion of the insert 54 does not detract from its sealing operation.

A serious difficulty arises in the use of an eccentric valve with the combined resilient material and metal seal. This difficulty is best explained with reference to FIGS. 12 and 13. Assume, for the purposes of explanation, that a plug 11' was formed with an eccentric portion 25' having an arcuate face 26' with a depression 52' therein, and that a resilient insert 54' was disposed in and bonded to the walls of the recess. To have good sealing contact with a seat surface, the insert 54' would be constructed so that it totally or partially projects beyond the surface 26'. If only this construction were employed, the edge 54a' of the insert, i.e., the edge which trails as the plug is rotated in a closing direction, would be subjected to chewing, cutting, or undue wear as the plug is moved to its closed position. As shown in FIG. 13, as the plug 11' is rotated in a closing direction (i.e., in the direction of the arrow), the insert 54' would be deformed between the seat 24' and the eccentric portion 25'. However, as the plug 11' approaches a fully closed postiion, the trailing edge would be rolled over and possibly caught between the corner of the seat 24' and the adjacent edge of the recess 52'. Further rotation of the plug 11' from the position shown in FIG. 13 would thus result in cutting or chewing of the edge 54a' so that the latter would soon be worn away and insufficient to effect a gas-tight seal.

This problem is obviated in the present instance by constructing the resilient insert 54 and the recess 52 in which it is disposed to define a relief space into which the insert can "flow," i.e., so that the insert has room to be deformed without being cut or chewed as the border portion 26a of the metal face 26 is moved into firm sealing contact with the seat 24. As illustrated in FIGS. 3, 11, and 14, this is accomplished by making the resilient insert undersize with respect to the recess 52 so as to create a relief groove 54c between the edge 54a and the adjacent edge of the recess 52. This relief groove 54c is thus disposed along that edge of the recess 52 which last comes into registry with the seat 24 as the plug is rotated to its fully closed position.

The advantageous function of the relief groove 54c is illustrated in FIG. 15. As the plug 11 is rotated to its fully closed position, the raised insert 54 is brought into contact with the valve seat 24 and is considerably deformed so that it provides a gastight seal. However, sa the edge portion 54a is deformed, the resilient material has room to flow into the region of the relief groove 54c, so that the edge portion is not caught or cut between the corner of the seat 24 and the edge of the recess 52. The border portion 26a of the arcuate face 26 thus can be brought into firm contact with the metal seat surface 24, while the resilient insert 54 is deformed into sealing engagement with the seat surface, and without any danger of cutting or unduly wearing the resilient material. It will be understood that this same advantageous operation may be obtained by various alternative arrangements in which the resilient insert 54 is made smaller in total volume than the recess 52, and so when deformed, the trailing edge of the insert can flow into the extra space provided in the recess.

As noted previously, the relief space or groove 54c is provided adjacent that part of the face 26 which last comes into registry with the seat surface 24 as the plug 11 is rotated to a closed position. It is here that the likelihood of cutting or chewing of the insert 54 is greatest. At the leading edge of the insert 54 no relief groove need be provided, inasmuch as rotation of the plug will cause the leading portion of the insert to be deformed in a counter-clockwise direction (see FIG. 11). The body of the resilient insert 54 will permit this deformation or flowing of the leading portion without danger of cutting or unduly wearing the latter.

The resilient insert 54, as described above makes it possible for the present valve to seal against leakage when closed even if subject to extremely high reverse pressures. Assume with reference to FIG. 10 that a very high fluid pressure exists in the opening 16 and that the interior of the valve body communicates with a low pressure line. The high pressure acting on that portion of the insert 54 which registers with the opening 16 will tend to deform and dish the central portion of the insert inwardly. The resilient material will thus be squeezed or tend to "flow" into the edge portions which contact the seat 24. Thus, the greater the reverse pressure becomes, the greater will be the deformation of the insert 54 between the plug recess 52 and the seat 24, so that a tighter seal to prevent leakage is created.

It will be understood from the foregoing that the present valve brings to this art significant improvements which not only result in a more compact and less expensive eccentric plug valve, but which also make possible a lower operating torque to turn the plug while successfully overcoming the tendency of the plug to slam. Moreover, the present valve is one which is easily assembled and disassembled. It requires no lubrication during years of service. Moreover, the valve is one in which gastight closure is effected by a resilient insert which cannot be damaged or appreciably worn despite repeated opening and closing cycles of operation.

I claim as my invention:

1. In an eccentric plug type valve, the combination comprising a valve body having walls defining a circular entrance, a plug inserted into said entrance and rotatable about the axis thereof between open and closed positions, said valve body having a fluid flow passage therethrough opened and closed by an eccentric portion of said plug when the latter is rotated between its two positions, the eccentric portion of said plug when partially open having a force exerted thereon by passing fluid which tends to slam it to one of said positions, said plug having a cylindrical portion disposed in said entrance, first and second annular grooves defined in the wall of said entrance, a resilient deformable ring disposed in said first groove and deformed into sealing engagement with said circular portion, a braking ring of friction material overlying a radial end surface on said cylindrical portion, a radially compressible retainer ring held captive in said second groove and extending therefrom to overlie said braking ring, and means on said plug causing fluid pressure in said valve body to urge it outwardly of said entrance so that said braking ring is compressed between said plug and retaining ring to create a retarding force on said plug which prevents slamming of the latter.

2. In an eccentric plug type valve, the combination comprising a hollow body having inlet and outlet openings and walls defining a circular entrance, an arcuate seat surface having a first radius and a first center of curvature surrounding one of said openings, an eccentric plug inserted through said entrance and journaled for rotation in said body about an axis displaced from said first center of curvature, an arcuate sealing surface on said plug having a second radius of curvature substantially equal to said first radius and having a second center of curvature which is displaced from said axis, said plug having a head portion circular about said axis and disposed in said entrance, first and second annular grooves defined in the walls of said entrance, a ring of deformable, resilient material disposed in said first groove and sealingly engaged against said circular head portion, a braking ring of wear-resistant material overlying an end surface portion of said plug, a radially resilient retainer ring captive in said second groove and extending therefrom to overlie said braking ring and retain said plug in said body, and means on said plug to urge the latter outwardly of the entrance in response to and with a force dependent upon fluid pressure within said body, thereby to compress said braking ring between said retainer ring and plug and to create frictional resistance to rotation of said plug which increases with increasing fluid pressure to resist slamming of the plug.

3. In an eccentric plug type valve, the combination comprising a hollow body having alined inlet and outlet openings with a flow passage therebetween, said body further having a wall defining a circular entrance with its axis substantially normal to said flow passage, a plug having a cylindrical head portion disposed in said entrance and an eccentric portion extending across said flow passage, means journaling said plug in said body for rotation about said axis to swing said eccentric portion between closed and opened positions relative to one of said openings, said body having an arcuate seat surrounding one of said openings, said entrance having a radius substantially greater than the radius of said seat, said body having first and second annular grooves axially spaced apart and defined in the wall of said entrance, said head portion having its exposed end radially stepped to define a radially extending end surface and an axially extending shoulder surface, said radially extending end surface having a substantially greater radius than said seat, a resilient, deformable sealing ring held captive in said first groove and deformed into sealing contact with the walls of that groove and the adjacent surface of said head portion, a washer-shaped wear ring of friction material disposed on said end surface and retained radially by said shoulder surface, a radially compressible snap ring held captive in said second groove and projecting therefrom to overlie said wear ring, said snap-ring having an internal radius approximately equal to the radius of said shoulder and restrained against radial compression by that shoulder, and means on said plug to urge the latter outwardly of the entrance in response to and with a force dependent upon fluid pressure within said body, thereby to compress said wear ring between said snap ring and plug and to create frictional resistance to rotation of said plug which increases with increasing fluid pressure to resist slamming of the plug.

4. In an eccentric plug type valve having a body and an eccentric plug disposed therein, the combination comprising means on said body defining a circular entrance bounded by a circular wall, first and second annular grooves defined in said wall and spaced axially apart in the order named from the mouth of said entrance, a cylindrical head portion on said plug disposed in said entrance, a bearing ring disposed in said entrance axially inward from said second groove and journaling said cylindrical portion, a ring of resilient, elastomer material disposed in said second groove and deformed into fluid-sealing contact with the walls of the groove and the adjacent surface of said head portion, a stepped axial shoulder bordered by a radial face formed on the end of said head portion, a braking ring of friction material disposed on said radial face, a resilient, radially compressible snap ring captively disposed in said first groove and projecting therefrom to overlie said braking ring, the inner edge of said snap ring being closely spaced to said shoulder, and means on said plug to urge the latter outwardly of the entrance in response to and with a force dependent upon fluid pressure within said body, thereby to compress said braking ring between said snap ring and plug and to create frictional resistance to rotation of said plug which increases with increasing fluid pressure to resist slamming of the plug.

5. In an eccentric plug type valve, the combination comprising a valve body having walls defining a circular entrance, a plug inserted into said entrance and rotatable about the axis thereof between open and closed positions, said valve body having a fluid flow passage therethrough opened and closed by an eccentric portion of said plug when the latter is rotated between its two positions, the eccentric portion of said plug when partially open having a force exerted thereon by passing fluid which tends to slam it to one of said positions, said plug having a cylindrical portion disposed in said entrance, first and second annular grooves defined in the wall of said entrance, a resilient deformable ring disposed in said first groove and sealingly engaged with said circular portion, a braking ring of friction material overlying a radial end surface on said cylindrical portion, a radially compressible retainer ring held captive in said second groove and extending therefrom to overlie said braking ring, means for biasing said plug axially outwardly of said entrance to compress said braking ring between said end surface and said retainer ring to cause the latter to frictionally retard rotation of said plug, and means on said plug causing fluid pressure in said valve body to urge it outwardly of said entrance so that said braking ring is further compressed between said retaining ring to further frictionally retard rotation of said plug and prevent slamming of the latter at increased fluid pressures.

6. In an eccentric plug type valve, the combination comprising a hollow body having inlet and outlet openings and walls defining a circular entrance, an arcuate seat surface having a first radius and a first center of curvature surrounding one of said openings, an eccentric plug inserted through said entrance and journaled for rotation in said body about an axis displaced from said first center of curvature, an arcuate sealing surface on said plug having a second radius of curvature substantially equal to said first radius and having a second center of curvature which is displaced from said axis, said plug having a head portion circular about said axis and disposed in said entrance, first and second annular grooves defined in the walls of said entrance, a ring of deformable, resilient material disposed in said first groove and sealingly engaged against said circular head portion, a braking ring of wear-resistant friction material overlying an end surface portion of said plug, a radially resilient retainer ring captive in said second groove and extending therefrom to overlie said braking ring and retain said plug in said body, a compression spring interposed between said plug and an interior wall of said body to bias the plug axially and create an initial compression of said braking ring between said end surface and said retainer ring, and means on said plug to urge the latter outwardly of the entrance in response to and with a force dependent upon fluid pressure within said body, thereby to further compress said braking ring between said retainer ring and plug and to create a total frictional resistance to rotation of said plug which increases with increasing fluid pressure in the body to resist slamming of the plug.

7. In an eccentric plug type valve, the combination comprising a hollow body having alined inlet and outlet openings with a flow passage therebetween, said body further having a wall defining a circular entrance with its axis substantially normal to said flow passage, a plug having a cylindrical head portion disposed in said entrance and an eccentric portion extending across said flow passage, means journaling said plug in said body for rotation about said axis to swing said eccentric portion between closed and opened positions relative to one of said openings, said body having first and second annular grooves axially spaced apart and defined in the wall of said entrance, said head portion having its exposed end radially stepped to define a radially extending end surface and an axially extending shoulder surface, a resilient, deformable sealing ring held captive in said first groove and in sealing contact with the walls of that groove and the adjacent surface of said head portion, a washer-shaped wear ring of friction material disposed on said end surface and retained radially by said shoulder surface, a radially compressible snap ring held captive in said second groove and projecting therefrom to overlie said wear ring, said snap-ring having an internal radius approximately equal to the radius of said shoulder and restrained against radial compression by that shoulder, means yieldably biasing said plug axially outward of said entrance to keep said snap ring firmly pressed against said wear ring, whereby said snap ring cannot be radially compressed and removed from said second groove unless said plug is affirmatively shifted against the force of said biasing means to locate said shoulder clear of the inner edge of the snap ring, and means on said plug to urge the latter outwardly of the entrance in response to and with a force dependent upon fluid pressure within said body, thereby to compress said wear ring between said snap ring and plug and to create frictional resistance to rotation of said plug which increases with increasing fluid pressure to resist slamming of the plug.

8. In an eccentric plug type valve having a body and an eccentric plug disposed therein, the combination comprising means on said body defining a circular entrance bounded by a circular wall, first and second annular grooves defined in said wall and spaced axially apart in the order named from the mouth of said entrance, a cylindrical head portion on said plug disposed in said entrance, a bearing ring disposed in said entrance axially inward from said second groove and journaling said cylindrical portion, a ring of resilient, elastomer material disposed in said second groove and deformed into fluid-sealing contact with the walls of the groove and the adjacent surface of said head portion, a stepped axial shoulder bordered by a radial face formed on the end of said head portion, a braking ring of friction material disposed on said radial face, a resilient, radially compressible snap ring captively disposed on said first groove and projecting therefrom to overlie said braking ring, the inner edge of said snap ring being closely spaced to said shoulder, a compressed spring interposed between said plug and an inner wall of said body to yieldably bias the plug in a direction axially outward of said entrance, and means on said plug to urge the latter outwardly of the entrance in response to and with a force dependent upon fluid pressure within said body, thereby to compress said braking ring between said snap ring and plug and to create frictional resistance to rotation of said plug which increases with increasing fluid pressure to resist slamming of the plug.

References Cited in the file of this patent

UNITED STATES PATENTS

| | | |
|---|---|---|
| 1,882,287 | Leach | Oct. 11, 1932 |
| 2,499,732 | Diehl | Mar. 7, 1950 |
| 2,516,425 | Sarver | July 25, 1950 |
| 2,539,636 | Runge | Jan. 30, 1951 |
| 2,574,428 | Wheatley | Nov. 6, 1951 |
| 2,605,993 | Bowan | Aug. 5, 1952 |
| 2,708,094 | Heinen | May 10, 1955 |
| 2,765,142 | Ludeman | Oct. 2, 1956 |
| 2,803,426 | Zurik | Aug. 20, 1957 |
| 2,841,429 | McCuistion | July 1, 1958 |
| 2,929,606 | Kaiser | Mar. 22, 1960 |
| 2,973,182 | Gill | Feb. 28, 1961 |
| 2,999,510 | Volpin | Sept. 12, 1961 |
| 3,064,940 | Anderson | Nov. 20, 1962 |